US011610277B2

(12) United States Patent
Krovvidi

(10) Patent No.: US 11,610,277 B2
(45) Date of Patent: Mar. 21, 2023

(54) SEAMLESS ELECTRONIC DISCOVERY SYSTEM WITH AN ENTERPRISE DATA PORTAL

(71) Applicant: Open Text Holdings, Inc., Wilmington, DE (US)

(72) Inventor: Shiva Sri Santosha Phani Krishna Krovvidi, Tanuku (IN)

(73) Assignee: Open Text Holdings, Inc., Wilmington, DE (US)

(*) Notice: Subject to any disclaimer, the term of this patent is extended or adjusted under 35 U.S.C. 154(b) by 116 days.

(21) Appl. No.: 16/749,920

(22) Filed: Jan. 22, 2020

(65) Prior Publication Data

US 2020/0242710 A1 Jul. 30, 2020

Related U.S. Application Data

(60) Provisional application No. 62/797,084, filed on Jan. 25, 2019.

(51) Int. Cl.
*G06Q 50/18* (2012.01)
*G06F 16/93* (2019.01)
*G06F 3/0482* (2013.01)

(52) U.S. Cl.
CPC ............ *G06Q 50/18* (2013.01); *G06F 16/93* (2019.01); *G06F 3/0482* (2013.01)

(58) Field of Classification Search
CPC ........ G06Q 50/18; G06F 16/93; G06F 3/0482
IPC ................................. G06Q 50/18; G06F 16/93
See application file for complete search history.

(56) References Cited

U.S. PATENT DOCUMENTS

| | | | |
|---|---|---|---|
| 5,826,257 | A | 10/1998 | Snelling, Jr. |
| 5,862,325 | A | 1/1999 | Reed et al. |
| 5,950,196 | A | 9/1999 | Pyreddy et al. |
| 6,014,680 | A | 1/2000 | Sato et al. |
| 6,222,530 | B1 | 4/2001 | Sequeira |
| 6,233,575 | B1 | 5/2001 | Agrawal et al. |
| 6,539,375 | B2 | 3/2003 | Kawasaki |
| 6,546,385 | B1 | 4/2003 | Mao et al. |
| 6,694,329 | B2 | 2/2004 | Murray |
| 6,757,710 | B2 | 6/2004 | Reed |
| 6,999,962 | B2 | 2/2006 | Julliard et al. |

(Continued)

FOREIGN PATENT DOCUMENTS

| | | |
|---|---|---|
| EP | 2590117 A1 | 5/2013 |
| EP | 3022659 | 5/2016 |

(Continued)

OTHER PUBLICATIONS

Cooper et al., OBIWAN-a visual interface for prompted query refinement, Jan. 6-9, 1998, IEEE, vol. 2, 277-285.

(Continued)

*Primary Examiner* — Asher D Kells
(74) *Attorney, Agent, or Firm* — Carr & Ferrell LLP

(57) ABSTRACT

Seamless electronic discovery systems with an enterprise data portal are disclosed herein. An example system includes a document collection system that collects relevant documents from one or more target sources, an investigation platform that processes the relevant documents and a portal system that interfaces the document collection system and the investigation platform to provide end-to-end electronic discovery using tracking units that provide chain-of-custody proof.

25 Claims, 15 Drawing Sheets

(56) References Cited

U.S. PATENT DOCUMENTS

| | | |
|---|---|---|
| 7,143,089 B2 | 11/2006 | Petras et al. |
| 7,747,631 B1 | 6/2010 | Puzicha et al. |
| 7,890,533 B2 | 2/2011 | Pollara |
| 7,949,629 B2 | 5/2011 | Pollara |
| 7,958,164 B2 | 6/2011 | Ivanov et al. |
| 7,996,211 B2 | 8/2011 | Gao et al. |
| 8,010,341 B2 | 8/2011 | Achan et al. |
| 8,024,333 B1 | 9/2011 | Puzicha et al. |
| 8,103,678 B1 | 1/2012 | Puzicha et al. |
| 8,140,323 B2 | 3/2012 | Johnson et al. |
| 8,204,738 B2 | 6/2012 | Skuratovsky |
| 8,266,148 B2 | 9/2012 | Guha et al. |
| 8,306,922 B1 | 11/2012 | Kunal et al. |
| 8,311,950 B1 | 11/2012 | Kunal et al. |
| 8,429,159 B1 | 4/2013 | Puzicha et al. |
| 8,433,558 B2 | 4/2013 | Bangalore et al. |
| 8,443,013 B1 | 5/2013 | Lin et al. |
| 8,566,897 B2 | 10/2013 | Sequeira |
| 8,589,394 B2 | 11/2013 | Vignet |
| 8,589,419 B2 | 11/2013 | Puzicha et al. |
| 8,856,642 B1 | 10/2014 | Riediger et al. |
| 8,943,397 B2 | 1/2015 | Palleschi et al. |
| 8,965,886 B2 | 2/2015 | Puzicha et al. |
| 9,146,916 B2 | 9/2015 | Moroze |
| 9,495,347 B2 | 11/2016 | Stadermann et al. |
| 10,102,193 B2 | 10/2018 | Riediger et al. |
| 10,191,893 B2 | 1/2019 | Riediger et al. |
| 10,387,557 B2 | 8/2019 | Riediger et al. |
| 10,650,091 B2 | 5/2020 | Riediger et al. |
| 10,762,142 B2 | 9/2020 | Puzicha et al. |
| 11,048,762 B2 | 6/2021 | Puzicha et al. |
| 2001/0014852 A1 | 8/2001 | Tsourikov et al. |
| 2001/0047290 A1 | 11/2001 | Petras et al. |
| 2002/0040375 A1 | 4/2002 | Simon et al. |
| 2002/0095454 A1 | 7/2002 | Reed et al. |
| 2002/0099714 A1 | 7/2002 | Murray |
| 2002/0103834 A1 | 8/2002 | Thompson et al. |
| 2002/0107853 A1 | 8/2002 | Hofmann et al. |
| 2002/0194026 A1 | 12/2002 | Klein et al. |
| 2003/0018668 A1 | 1/2003 | Britton et al. |
| 2003/0191727 A1 | 10/2003 | Yao et al. |
| 2003/0200533 A1 | 10/2003 | Roberts et al. |
| 2003/0212544 A1 | 11/2003 | Acero et al. |
| 2003/0217052 A1 | 11/2003 | Rubenczyk et al. |
| 2003/0229854 A1 | 12/2003 | Lemay |
| 2004/0078190 A1 | 4/2004 | Fass et al. |
| 2004/0193520 A1 | 9/2004 | LaComb et al. |
| 2004/0202065 A1 | 10/2004 | Chen |
| 2006/0010029 A1 | 1/2006 | Gross |
| 2006/0020942 A1 | 1/2006 | Ly et al. |
| 2006/0155703 A1 | 7/2006 | Dejean et al. |
| 2007/0011134 A1 | 1/2007 | Langseth et al. |
| 2007/0214010 A1 | 9/2007 | Beaver et al. |
| 2007/0271249 A1 | 11/2007 | Cragun et al. |
| 2008/0132799 A1 | 6/2008 | Xue |
| 2008/0162111 A1 | 7/2008 | Bangalore et al. |
| 2008/0172597 A1 | 7/2008 | DeHaan |
| 2008/0221874 A1 | 9/2008 | Cao et al. |
| 2008/0294679 A1 | 11/2008 | Gatterbauer et al. |
| 2009/0013246 A1 | 1/2009 | Cudich et al. |
| 2009/0044095 A1 | 2/2009 | Berger et al. |
| 2009/0067717 A1 | 3/2009 | Iwasaki |
| 2009/0110279 A1 | 4/2009 | Jain et al. |
| 2009/0148048 A1 | 6/2009 | Hosomi |
| 2009/0175532 A1 | 7/2009 | Zuev |
| 2009/0300043 A1 | 12/2009 | MacLennan |
| 2010/0106485 A1 | 4/2010 | Lu et al. |
| 2010/0138894 A1 | 6/2010 | Kyojima |
| 2010/0145902 A1 | 6/2010 | Boyan et al. |
| 2010/0161627 A1 | 6/2010 | Vossen et al. |
| 2010/0174732 A1 | 7/2010 | Levy et al. |
| 2010/0257144 A1 | 10/2010 | Lambert et al. |
| 2010/0293451 A1 | 11/2010 | Carus |
| 2010/0312725 A1 | 12/2010 | Privault et al. |
| 2010/0325690 A1 | 12/2010 | Suzuki et al. |
| 2011/0029854 A1 | 2/2011 | Nashi et al. |
| 2011/0047166 A1 | 2/2011 | Stading et al. |
| 2011/0047171 A1 | 2/2011 | Paparizos et al. |
| 2011/0055206 A1 | 3/2011 | Martin et al. |
| 2011/0067005 A1 | 3/2011 | Bassin et al. |
| 2011/0106892 A1 | 5/2011 | Nelson et al. |
| 2011/0141521 A1 | 6/2011 | Qiao |
| 2011/0153647 A1 | 6/2011 | Hoellwarth |
| 2011/0295854 A1 | 12/2011 | Chiticariu et al. |
| 2012/0011428 A1 | 1/2012 | Chisholm |
| 2012/0030157 A1 | 2/2012 | Tsuchida et al. |
| 2012/0036130 A1 | 2/2012 | Light et al. |
| 2012/0099792 A1 | 4/2012 | Chevion et al. |
| 2012/0102049 A1 | 4/2012 | Puzicha et al. |
| 2012/0191865 A1 | 7/2012 | Duff et al. |
| 2012/0221583 A1 | 8/2012 | Kulack et al. |
| 2012/0296891 A1* | 11/2012 | Rangan ............... G06F 16/3347 707/722 |
| 2013/0013999 A1 | 1/2013 | Kerry-Tyerman et al. |
| 2013/0054419 A1 | 2/2013 | Yusko et al. |
| 2013/0073571 A1 | 3/2013 | Coulet et al. |
| 2013/0117012 A1 | 5/2013 | Orlin et al. |
| 2013/0124960 A1 | 5/2013 | Velingkar et al. |
| 2013/0166548 A1 | 6/2013 | Puzicha et al. |
| 2013/0198123 A1 | 8/2013 | Stadermann |
| 2013/0198201 A1 | 8/2013 | Fukuda et al. |
| 2013/0238550 A1 | 9/2013 | Mandelstein et al. |
| 2013/0238596 A1 | 9/2013 | Mandelstein et al. |
| 2013/0297412 A1 | 11/2013 | Batra et al. |
| 2013/0311490 A1 | 11/2013 | Mansfield et al. |
| 2014/0052755 A1 | 2/2014 | Pitman et al. |
| 2014/0122535 A1 | 5/2014 | Gerard et al. |
| 2014/0208218 A1 | 7/2014 | Carasso et al. |
| 2014/0214758 A1 | 7/2014 | Tripathi et al. |
| 2015/0026516 A1 | 1/2015 | Stadermann et al. |
| 2015/0026559 A1 | 1/2015 | Riediger et al. |
| 2015/0058374 A1 | 2/2015 | Golubev et al. |
| 2015/0074507 A1 | 3/2015 | Riediger et al. |
| 2015/0149879 A1 | 5/2015 | Miller et al. |
| 2015/0254791 A1 | 9/2015 | Stockton et al. |
| 2015/0286636 A1* | 10/2015 | Elkhou ............... G06Q 50/18 707/722 |
| 2015/0324338 A1 | 11/2015 | Levy et al. |
| 2017/0177650 A1 | 6/2017 | Devine et al. |
| 2018/0260370 A1 | 9/2018 | Riediger et al. |
| 2018/0300300 A1 | 10/2018 | Riediger et al. |
| 2019/0286667 A1 | 9/2019 | Puzicha et al. |
| 2019/0286668 A1 | 9/2019 | Puzicha et al. |

FOREIGN PATENT DOCUMENTS

| | | |
|---|---|---|
| EP | 3072063 A1 | 9/2016 |
| WO | WO2002027542 A1 | 4/2002 |
| WO | WO2012030954 A1 | 3/2012 |
| WO | WO2015009297 | 1/2015 |
| WO | WO2015012812 A1 | 1/2015 |
| WO | WO2015074071 A1 | 5/2015 |
| WO | WO2019178403 A1 | 9/2019 |

OTHER PUBLICATIONS

Xu et al., Query expansion using local and global document analysis, Aug. 1996, ACM, 4-11.

Grewal et al., A Visual Representation of Search-Engine Queries and Their Results, IEEE, vol. 1, pp. 352-356, 2000.

Cui, Hang et al., "Query Expansion by Mining User Logs," Jul./Aug. 2003, vol. 15, No. 4, 829-839.

Lelescu, Ana et al., "Approximate Retrieval from Multimedia Databases Using Relevance Feedback," 1999, IEEE, 215-223.

Chen, Hsin-Hsi, et al., "Mining tables from large scale HTML texts", Proceedings of the 18th conference on Computational linguistics-vol. 1, Association for Computational Linguistics, 2000, 7 pages.

Gatterbauer, Wolfgang, et al., "Table extraction using spatial reasoning on the CSS2 visual box model", Proceedings of the National Conference on Artificial Intelligence. Vol. 21. No. 2, Menlo Park, CA; Cambridge, MA; London; AAAI Press; MIT Press; 1999, 2006, 6 pages.

(56) References Cited

OTHER PUBLICATIONS

Liu, Ying, et al., "Improving the table boundary detection in pdfs by fixing the sequence error of the sparse lines", Document Analysis and Recognition, 2009, ICDAR'09, 10th International Conference on IEEE, 2009, 5 pages.

Liu, Ying, et al., "Tableseer: automatic table metadata extraction and searching in digital libraries", Proceedings of the 7th ACM/IEEE-CS joint conference on Digital libraries, ACM, 2007, 10 pages.

OmniPage, Nuance Communications, Inc., Burlington, Mass., USA; <http://www.nuance.com/for-business/by-product/omnipage/index.htm> accessed Oct. 29, 2013, 3 pages.

Pinto, David, et al., "Table extraction using conditional random fields", Proceedings of the 26th annual international ACM SIGIR conference on Research and development in information retrieval. ACM, 2003, 8 pages.

Pyreddy, Pallavi, et al., "Tintin: A system for retrieval in text tables", Proceedings of the second ACM international conference on Digital libraries. ACM, 1997, 12 pages.

RecoStar OCR Solution OpenText Corp., Waterloo, ON, Canada; http://www.opentext.com, accessed Oct. 29, 2013, 4 pages.

Tengli, Ashwin, et al., "Learning table extraction from examples," Proceedings of the 20th international conference on Computational Linguistics, Association for Computational Linguistics, 2004, 7 pages.

Yildiz, Burcu, et al., "pdf2table: A method to extract table information from pdf files." 2nd Indian Int. Conf. on AI, Pune. 2005, 13 pages.

Lerman et al., Using the Structure of Web Sites for Automatic Segmentation of Tables, ACM 2004, pp. 119-130, 12 pages.

Silva et al., Design of an End-to-end Method to Extract Information from Tables, Google 2006, pp. 144-171.

"International Search Report"and "Written Opinion of the International Searching Authority," Patent Cooperation Treaty Application No. PCT/US2013/050954, dated Dec. 23, 2013, 10 pages.

Wenzel et al., An Approach to Context0driven Document Analysis and Understanding, Google 2003, pp. 1-12.

Wang et al., Data Extraction and Label Assignment for Web Database, ACM 2003, pp. 187-196.

Eberius et al., Building the Dresden Web Table Corpus: A Classification Approach, IEEE 2015, pp. 41-50.

Shafait et al., Table Detection in Heterogeneous Documents, ACM 2010, pp. 65-72.

Extended European Search Report and Written Opinion, European Patent Application No. 13889423.3, dated Feb. 20, 2017, 7 pages.

"Office Action," European Patent Application No. 13889423.3, dated Sep. 6, 2019, 6 pages.

"International Search Report" and "Written Opinion of the International Searching Authority," Patent Cooperation Treaty Application No. PCT/US2013/051698, dated Feb. 10, 2014, 11 pages.

Begum et al. A Greedy approach for computing longest common subsequences. 2008. [retrieved on Jan. 22, 2014] Retrieved from the Internet: <http://www.sms.edu.pk/journals/jprm/jprmvol4/jprm9_4.pdfl>, 6 pages.

Kondrak et al. N-gram similarity and distance. 2005. [retrieved on Jan. 22, 2014] Retrieved from the Internet: <http://citeseerx.ist.psu.edu/viewdoc/download?doi=10.1.1.67.9369&rep=rep1&type=pdf>, 13 pages.

"International Search Report" and "Written Opinion of the International Searching Authority," Patent Cooperation Treaty Application No. PCT/US2014/066214, dated Apr. 3, 2015, 12 pages.

"Partial Supplementary European Search Report," European Patent Application No. 14861758.2, dated Jun. 23, 2017, 13 pages.

"Extended European Search Report and Written Opinion," European Patent Application No. 14861758.2, dated Sep. 29, 2017, 12 pages.

"International Search Report" and "Written Opinion of the International Searching Authority," Patent Cooperation Treaty Application No. PCT/US2019/22339, dated May 29, 2019, 10 pages.

"Summons to Attend Oral Proceedings," European Patent Application No. 13889423.3, Jun. 25, 2020, 7 pages.

"Office Action", European Patent Application No. 14861758.2, dated Dec. 16, 2020, 11 pages.

"Office Action", European Patent Application No. 13889423.3, dated May 10, 2021, 4 pages.

* cited by examiner

| Name | ECA name[s] 304 | ECA status 306 | R&A name[s] 308 | R&A status | #Collection sources 310 | #Collection targets 312 | #Data requests 314 |
|---|---|---|---|---|---|---|---|
| Alderaan | Alderaan | Running | Alderaan_Review | Running | 3 | 3 | 6 |
| Oxbow | Oxbow | Running | Oxbow_Review | Running | 3 | 4 | 4 |
| Enron | Enron | Running | Enron_Review | Running | 1 | 2 | 1 |
| Alderaan_2 | Alderaan_2 | Running | Alderaan_2_Review | Running | 1 | 1 | 1 |

4 items    10 per page

≡ ⌂ ∨   opentext™ | Discovery Enterprise Data Portal   ⊙

Collection sources

ⓘ Collection sources

| Name | Collection agent | #Collection targets | #Projects | #Data requests |
|---|---|---|---|---|
| Axcelerate FileShareSource | Axcelerate | 2 | 0 | 0 |
| Axcelerate Exchange 2013 | Axcelerate | 1 | 1 | 1 |
| Axcelerate SharePoint 2013 | Axcelerate | 1 | 1 | 1 |
| Cloud Exchange Source | EnCase | 1 | 0 | 0 |
| FileShareSource | EnCase | 2 | 3 | 5 |
| Exchange Server | EnCase | 1 | 1 | 3 |
| SAFE end-point | EnCase | 1 | 1 | 1 |
| TestFileshare | EnCase | 1 | 1 | 1 |

8 items    10 per page ∨

FIG. 4

Collection criteria opentext™ | Discovery Enterprise Data Portal

Collection Criteria

| Name | Collection agent | Criteria type | Criteria | #Data Requests | #Projects |
|---|---|---|---|---|---|
| test criteria | EnCase | Email | N/A | 0 | 0 |
| TestCriteria | EnCase | File | File collection from Ronnie | 0 | 0 |
| All files from the specified target | EnCase | File | Collect all files form the specified target | 3 | 2 |
| Emails containing "sdusa" in from | EnCase | Email | Emails which has "sdusa" in the from field | 0 | 0 |
| SAFE Criteria - All TIF Images | EnCase | File | Collect All TIF Images | 1 | 1 |
| Files of size greater than or equal to 10KB | EnCase | File | Collect files of size greater than or equal to 10 KB | 3 | 3 |
| Emails received on and after, JAN 1,2019 | EnCase | Email | Collect Emails received on and after January 1,2019 | 3 | 1 |
| Folder2 of Documents List | Axcelerate | SharePoint item | Folder2 of Documents List | 1 | 1 |
| Folder1 of Documents List | Axcelerate | SharePoint item | Folder1 of Documents List | 0 | 0 |
| Emails between 1st JAN 2019 and 18th JAN 2019 | Axcelerate | Email | Email between 1st JAN 2019 and 18th JAN 2019 | 0 | 0 |

16 Items    10 per page    < 1 | 2 >

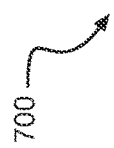

FIG. 7

| Name | Project | Collection source | Collection target[s] | Collection agent | Collection Criteria | Collection status | Data progression status | #Tracking units | Created date |
|---|---|---|---|---|---|---|---|---|---|
| Test_Aswani | Oxbow | FileShareSource | Ronnie File Share+1more... | EnCase | All files from the specified target | Complete | Publish complete | 2 | 2019/01/23 06:28 |
| Test Collection from Ronnie | Oxbow | TestFileshare | TestFolder | EnCase | All files from the specified target | Complete | Publish complete | 1 | 2019/01/22 09:40 |
| Demo multiple targets | Enron | FileShareSource | Ronnie File Share+1more... | EnCase | Files of size greater than or equal to 10KB | Complete | Publish complete | 2 | 2019/01/22 04:11 |
| Demo Oxbow collection | Oxbow | Axcelerate Exchange 2013 | Seddmdemo mailbox | Axcelerate | Emails between 1st DEC 2018 and 31st DEC 2018 | Complete | Publish failed | 1 | 2019/01/22 03:58 |
| Demo Axc Collection | Alderaan | Axcelerate SharePoint 2013 | Seddmdemo sharepoint | Axcelerate | Folder2 of Documents List | Complete | Publish complete | 1 | 2019/01/22 03:58 |
| Demo Collection Process | Alderaan | Exchange Server | seddmdemo target | EnCase | Emails received on and after JAN 1,2019 | Complete | Publish complete | 1 | 2019/01/22 03:53 |
| Ravi Smoke | Alderaan | FileShareSource | Johny File Share | EnCase | Files of size greater than or equal to 10KB | Complete | Publish complete | 1 | 2019/01/22 03:24 |
| Mani Test | Alderaan | Exchange Server | seddmdemo target | EnCase | Emails received on and after JAN 1,2019 | Complete | Publish complete | 1 | 2019/01/22 02:00 |
| Collect data for Alderann from Exchange using ENCASE | Alderaan | Exchange Server | seddmdemo target | EnCase | Emails received on and after JAN 1,2019 | Complete | Publish complete | 1 | 2019/01/22 11:43 |
| Collect data for Oxbow from Johny File Share using ENCASE | Oxbow | FileShareSource | Johny File Share | EnCase | Files of size greater than or equal to 10KB | Complete | Publish complete | 1 | 2019/01/22 11:22 |

SEAMLESS ELECTRONIC DISCOVERY SYSTEM WITH AN ENTERPRISE DATA PORTAL

CROSS-REFERENCE(S) TO RELATED APPLICATION(S)

This application claims the benefit and priority of U.S. Provisional Application Ser. No. 62/797,084, filed on Jan. 25, 2019, entitled "Seamless Enterprise Discovery System with Enterprise Data Portal," which is hereby incorporated by reference in its entirety, including all references and appendices cited therein, for all purposes.

FIELD OF INVENTION

Embodiments of the present disclosure relate to an enterprise data portal for use in electronic discovery or other similar electronic document review processes. In general, the enterprise portal provides a means for collecting, ingesting, processing, and publishing content such as electronic and/or digital documents using a plurality of tools integrated through the portal.

SUMMARY

Some embodiments may be directed to an electronic discovery system, comprising: a document collection system that collects relevant documents from one or more target sources; an investigation platform that processes the relevant documents; and a portal system that interfaces the document collection system and the investigation platform to provide end-to-end electronic discovery, the portal system being configured to: receive a document collection request, the request comprising criteria used to select the relevant documents from the one or more target sources; generate a tracking unit for the relevant documents, the tracking unit being used to track progression of the relevant documents from collection, to processing through the investigation platform, and to publishing; cause the document collection system to obtain the relevant documents from the one or more target sources; cause the investigation platform to process the relevant documents through an ingest and index process based on the criteria; and a publishing platform that is configured to publish any of the relevant documents identified by the investigation platform.

Some embodiments may be directed to a system comprising: a processor; and a memory for storing instructions, the processor executing the instructions to: receive a document collection request, the request comprising criteria used to select relevant documents from one or more target sources; generate a tracking unit for the relevant documents, the tracking unit being used to track progression of the relevant documents from collection, to processing through an investigation platform, and to publishing on a publishing platform; cause a document collection system to obtain the relevant documents from the one or more target sources; cause an investigation platform to process the relevant documents through an ingest and index process based on the criteria; and cause a publishing platform to publish any of the relevant documents identified by the investigation platform.

Some embodiments may be directed to a method comprising: receiving a content collection request, the request comprising criteria used to select relevant content from one or more target sources; generating a tracking unit for the relevant content, the tracking unit being used to track progression of the relevant content from collection, to crawling and indexing, and to publishing; causing a content collection system to obtain the relevant content from the one or more target sources; causing an investigation platform to process the relevant content through an ingest and index process based on the criteria; and causing a publishing platform to publish any of the relevant content identified by the investigation platform.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 3 is a graphical user interface that comprises attributes of various projects that have been created by a user.

FIG. 4 illustrates an example collection source graphical user interface.

FIG. 7 illustrates an example graphical user interface comprising collection criteria.

FIG. 8 illustrates an example graphical user interface comprising data request details.

FIG. 9 illustrates an example data request creation web form.

FIG. 12 illustrates a graphical user interface that comprises a bar graph that visually depicts a data progression summary relative to files collected, ingested, and published.

DETAILED DESCRIPTION

Figure 1A:
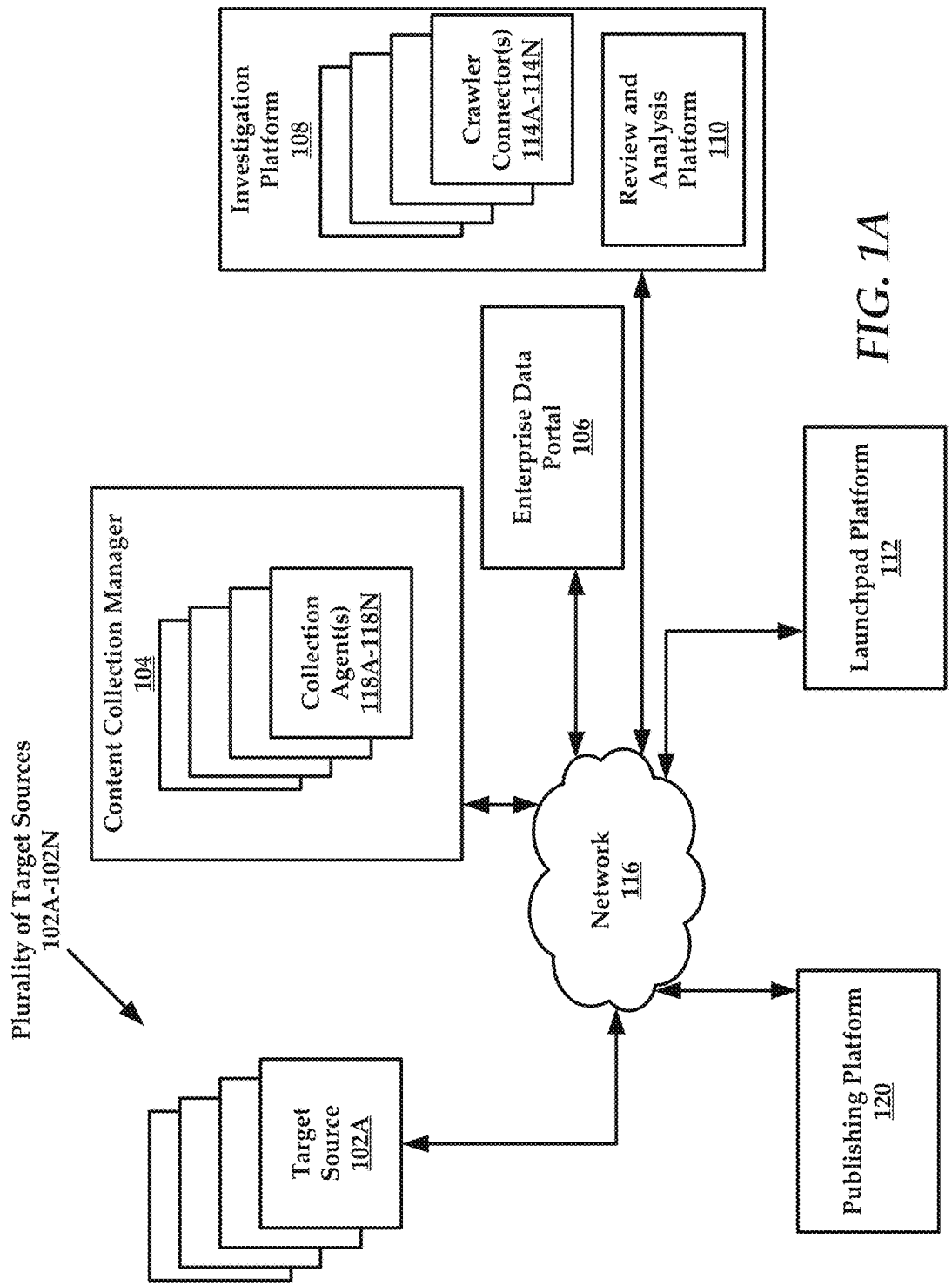
FIG. 1A depicts an illustrative architecture in which techniques and structures for providing the systems and methods disclosed herein may be implemented.

FIG. 1A illustrates an example architecture of a seamless electronic discovery system ("system 100") in which techniques and structures for providing the systems and methods disclosed herein may be implemented. Generally, a seamless electronic discovery system simplifies electronic discovery data management processes by providing complete automation and chain of custody verification in data progression. That is, documents processed using the seamless electronic discovery system can be tracked during all stages of collection, processing, and publishing.

The system 100 comprises a plurality of target sources 102A-102N (e.g., endpoints) that can include laptops, desktops, mobile devices, servers, cloud resources, and so forth. Each of these endpoints can contain or access electronic content such as documents, emails, and other similar electronic data that includes at least some textual content. The electronic content can include audio content, video content, digital data and the like. Thus, while the term "document" may be used in some examples, the systems and methods disclosed herein are not limited to processing only documents but any desired electronic data. These electronic data can be collected and preserved to comply with litigation production requirements, generally referred to as electronic discovery.

The system 100 can also comprise a content collection manager 104, an enterprise data portal 106, an investigation platform 108, a review and analysis platform 110, a launchpad platform 112, and a publishing platform 120. While each of these sub-systems will be described individually, the functionalities of one or more of these sub-systems can be combined in some instances. In some embodiments, the components of the system 100 can be communicatively coupled using a network 116 that can include any public and/or private network that would be known to one of ordinary skill in the art. In general, the launchpad platform 112 functions as a central operation and administration tool in the system. It provides a central location for clients and litigation support personnel to create and configure cases, monitor progress on these cases, and assign users to work on these cases in different roles. Launchpad platform 112 interacts with all the other applications in the electronic discovery setup and synchronizes status of data and tracking objects all through their life-cycles.

As noted above, the content collection manager 104 can be configured to obtain documents from the plurality of target sources 102A-102N such as laptops, desktops, mobile devices, servers, clouds, containers, and other similar systems or devices. The content collection manager 104 can deploy various collection agents 118A-118N to collect documents from the collection targets.

In general, users can utilize the content collection manager 104 (through use of the enterprise data portal 106) to identify what documents should be collected from the various target sources 102A-102N. For example, a user can specify that the desire to obtain all emails from a specified cloud repository. In some instances, the user can specify additional details that specify that only certain documents should be returned (e.g., criteria). For example, the user can specify that they only want documents corresponding to a particular individual (such as a custodian or other individual who provides data for a litigation document review process), or documents having certain keywords or concepts, or from a specific time frame—just to name a few examples. In some embodiments, the content collection manager 104 can deploy and utilize agents to obtain documents from one or more targets. The content collection manager 104 can collect documents that are selected using criteria or the content collection manager 104 can obtain documents in chunks. In general, a chunk comprises a small group of documents. For example, a corpus or collection of 10,000 files can be chunked into 10 chunks of 1000 files each. Chunking large batches of files allow the systems disclosed herein to initiate processing a first 1000 files while the last 1000 files are yet to be collected or being collected.

An enterprise data portal 106 functionally links the content collection manager 104 with the investigation platform 108. In general, the integration between the content collection manager 104 and the investigation platform 108 provides seamless data flow and exhaustive document collection through the plurality of target sources 102A-102N all through a single integration interface. The also enterprise data portal 106 provides, automated data progression, client customizations, complete chain of custody, data discovery, and case administration.

With respect to automated data progression, the system 100 provides a single point of control, allowing users to leverage the functionalities of both the content collection manager 104 and the investigation platform 108 simultaneously. The system 100 also allows a user to collect documents from the target sources 102A-102N using user-selected criteria. The system 100 can also provide rule-based data progressions. For example, a user can specify the order in which certain document processing operations are performed. In one use case a user can specify that all document types can be processed to identify certain names of individuals, and then in a subsequent process identify relevant keywords or phrases for documents that include the named individuals.

The investigation platform 108 also leverages the functionalities of the review and analysis platform 110. The enterprise data portal 106 provides for robust endpoints collection through the content collection manager 104 and direct cloud collection of documents through a crawler connector functionality of the investigation platform 108. In some embodiments, the enterprise data portal 106 can coordinate content collection manager 104 and crawler connectors 114A-114N of the investigation platform 108, providing for seamless document collection using portions of each system. Criteria-based.

The crawler connectors 114A-114N can ingest documents which can include crawling and indexing the documents. That is, the crawler connectors 114A-114N can be used to identify textual content in the documents, as well as identify a document type for a document. For example, a document can be crawled and analyzed to identify the document as an email, a webpage, a word processing document, or other general document type. The textual content in the document can also be analyzed for indexing. Specific words, phrases, or other content can be identified.

That is, each of the crawler connectors 114A-114N can pre-process documents from one or more of the plurality of target sources 102A-102N. In some instances, each of the crawler connectors 114A-114N can process a document for a particular purpose. For example, one of the crawler connectors 114A-114N can be configured to identify documents having credit card numbers, while another one of the crawler connectors 114A-114N can be configured to identify phone numbers in documents.

Thus, the enterprise data portal 106 can utilize independent functions provided by two distinct systems (e.g., enterprise data portal 106 and investigation platform 108), coordinating their efforts for a specific purpose or set of purposes involving any of the collection, processing, or publishing of electronic documents in discovery-related tasks. The enterprise data portal 106 provides staged data intake in some embodiments using the crawler connectors 114A-114N. In other embodiments, the enterprise data portal 106 can be embodied in an on-premises appliance or in an in-pod setup. In other embodiments, the enterprise data portal 106 can be accessed virtually as a service.

As noted above, the investigation platform 108, using the crawler connectors 114A-114N, can pre-process the documents obtained from the plurality of target sources 102A-102N to reduce a number of documents using high-level filtering. That is, the volume of documents found using the document collection manager can be reduced to based on relevance using the investigation platform 108. The high-level filtering can include the use of culling and collection criteria and/or keyword search-term criteria.

The investigation platform 108 can narrow scope of review with user-directed controls that leverage more than different metadata fields from basics such as date, source and file type to advanced communication properties. The investigation platform 108 can identify key phrases within documents and create a conceptual map based on relationships among words. The investigation platform allows a user to identify terms that they may have missed while including or excluding select phrases for better search results.

The investigation platform 108 can also pre-process documents to identify who wrote a document to whom, from which domains documents were transmitted/received, when documents were sent and how often documents occurred in the target sources 102A-102N. The investigation platform 108 allows a user to identify data sent to a personal account or an unknown third party.

Thus, once documents have been retrieved, the documents are then subject to processing through the investigation platform 108. The investigation platform 108 can allow for broad types of document processing, such as family level de-duplication of documents (e.g., where identical or duplicative material is excised). A full-text index of all de-duplicated documents can be generated by the investigation platform 108, which includes creating an index that is searchable by keyword or phrases. Users or automated processes can then be used to further reduce the document count using the index. In one example use case, de-duplication could occur when emails in an email string are found during document identification and processing. Multiple emails in the email string are returned, but some may have duplicative information. For example, a single email in the chain may include a relevant social security number. The investigation platform 108 can keep only one email from the string and remove the rest to de-duplicate the data.

In some embodiments, the investigation platform 108 allows for both foldering and tagging of documents based on, for example, category types. For example, all emails can be placed in one folder. In some embodiments, sub-folders can be created that would allow, for example, separation of emails based on sender name into separate sub-folders. In some embodiments, the investigation platform 108 can employ early case assessment (ECA) analytics. In some instances, the investigation platform 108 applies continuous machine learning to identify relevant content in any data set, while also providing flexible, accurate and defensible predictive coding of documents. In some instances, the investigation platform 108 can incorporate feedback received from the review and analysis platform 110. That is, the investigation platform 108 may process documents in an automated manner using criteria/rules. Further analysis by subject matter experts may occur at the review and analysis platform 110 level. If a document that was identified by the investigation platform 108 as being relevant is determined by a subject matter expert to be irrelevant, the rejection of this document can be fed back to the investigation platform 108 to update its machine learning logic so that future documents are processed more accurately. In another example, a subject matter expert may correct the predictive coding of a document. These corrections can be used to update/train the machine learning logic of the investigation platform 108.

Also, the investigation platform 108 can automatically redact sensitive data such as phone numbers, social security numbers (SSNs) and credit cards—virtually any identifiable pattern—in individual documents or across entire data sets. For example, the investigation platform 108 can identify social security numbers in emails and redact the same prior to allow an authorized end user, such as an attorney, to view the documents.

Once the documents have been provisionally processed using the investigation platform 108, the documents can be further processed using the review and analysis platform 110. In general, the review and analysis platform 110 provides a user interface that allows a user to review workflows (discussed in greater detail infra), provide a means for review and batch management, full production, and productivity reporting—just to name a few.

The investigation platform 108 can be configured to provide early case assessment for the data that enters this stage. The tool builds a full-text index on the contents of the documents promoted to investigation and allows the client to do content level searching, full text culling, de-duplication and assessment based on advanced analytics like phrases and concept groups identified. The investigation platform 108 can build a full text index of collected content that will allow for identification, investigation, full-text culling, and global de-duplication based on the content in the documents. The investigation platform 108 can allow the user to interact with the phrases and concept groups identified, and will allow content level search capabilities on the document set. The investigation platform 108 can allow a user to define criteria on the document set for promotion to review, as well as update launchpad platform 112 of the data in the investigation platform 108 and the subset of documents that have been promoted to review for tracking purposes. Investigation platform 108 can allow a client to choose which matter/review instance to which a selected document set is published.

In some embodiments, the use of the content collection manager 104 can be facilitated through a launchpad platform 112. The launchpad platform 112 provides general system management functionalities such as user and matter management, as well as meta-features such as cross-case reporting, such as when documents found in one search are relevant to another search.

In an example use case, a project is initiated within the system 100 that includes, for example, a litigation case or eDiscovery data processing request for which a workspace is created within the system 100 through use of the enterprise data portal 106. One or more of the crawler connectors 114A-114N are enabled to reach out to data hosting locations such as the target sources 102A-102N to collect data such as electronic documents. For example, the target sources 102A-102N could include a folder on a file-sharing service, a mailbox on an exchange server, or any other location where electronic documents of any kind may be stored.

Using the enterprise data portal 106, a user can specify collection criteria such as "identify files modified in the last three months" or "emails with attachments". As noted above, these collection criteria can be used to identify a corpus of documents that belong to broad-based categories. The collection criteria can be more granular to help identify documents with very specific attributes in some instances.

The system 100 can provide a user with a collection status in some instances that provide an indication as to the status of a data collection process relative to a given data set. For example, a status could include pending, in-progress, completed, or failed. In some instances, the system 100 can provide a user with a data progression status of the data request that indicates how far in the collection process a data request has reached. For example, a publish-in-process status indicates that some data have been published to the review and analysis platform 110, while additional data is currently being collected or processed.

As noted above, the enterprise data portal 106 provides a complete chain of custody control. The enterprise data portal 106 can implement tracking unit functionality where a set of collected documents (e.g., a sub-set of relevant content/documents) obtained at a specific point in time is assigned a tracking unit identifier. The tracking unit identifier allows any portion of the enterprise data portal 106 to identify where these documents are at in the electronic discovery reference model (EDRM) cycle. The tracking unit identifier is used to establish chain of custody and a reference for document audits. Generally, a tracking unit is a fundamental atomic unit of data used for tracking purposes. It will be understood that all data of a tracking unit travels together through the system with no additions or no deletions to the number of documents in the tracking unit being allowed. In some embodiments, persistent data for a tracking unit is data which does not satisfy the criteria for promotion (e.g., culled data).

A tracking unit can be maintained at a custodian-collection source association (CSA) level. In other words, all data belonging to a CSA that is either ships together or is ingested together (for data collected and shipped external to a remote collection tool). The tracking unit can itself have a unique identifier, as well as a case identifier that links the tracking unit back to a greater document collection/processing task/request. The tracking unit can also identify a collection target (an identified of a system from which the data in tracking unit was obtained), a stage identifier that identifies where in document processing the tracking unit currently resides, as well as a status. Also, the tracking unit can be assigned a generation identifier that is indicative of what stage in the document collection and/or processing phases the tracking unit was created.

A tracking unit may be defined (generated) whenever any untracked data that belongs to a CSA (Custodian Source Association) is promoted from one stage to another within the system 100. This can happen in two example instances: (1) remote collection, when data (document set) is picked for adding to delivery in remote collection and the delivery is generated, all data that belongs to a CSA (Custodian Source Association) can be marked under one tracking unit (and moves along with the Delivery and to later stages); and (2) processing for data collected through external collection, the CSA is done for staged data in a processing aspect of the system 100. When some data (document set) can be promoted to investigation, all promoted data that belongs to a CSA (Custodian Source Association) will be marked under one tracking unit.

Figure 1B:
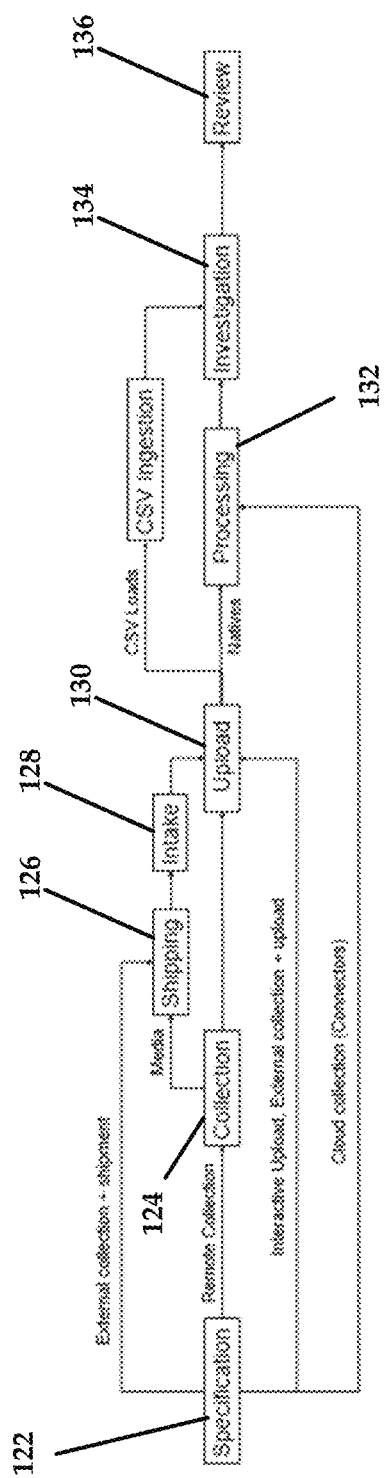
FIG. 1B schematically illustrates an example state model for a tracking unit of the present disclosure.

FIG. 1B illustrates an example state model for a tacking unit. FIGS. 1A and 1B will be described collectively. The specification stage 122 involves a user defining a request in the launchpad platform 112. During the collection stage 124, a request for documents is currently (or at least partially) in collection. In the shipment stage 126, content such as physical media are being shipped to a central location. In the intake stage 128, media is ingested, and the upload stage 130 involves an interactive or SFTP (simple file transfer protocol) upload of content to a transfer location (with an option to copy the data to a staging location). A processing stage 132 involves an inventory process into a shallow index, performance of exception resolution, custodian tagging, meta-data level culling, and publishing from the shallow index to the investigation platform 108 can occur. To be sure CSV (Comma Separated Value) data can be processed in a parallel method.

During an investigation stage 134, full-text culling and publishing from the investigation platform 108 to the review and analysis platform 110 can occur. At a review stage 136 all requested and processed data are available for review, and in a deleted stage (not shown) a collection source has been deleted (or alternatively all data for a particular collection source has been deleted). For any of these stages mentioned above, a tracking unit can have a status that can include any of pending, in-progress, completed, exception resolution needed, or failed.

This unique strategy for electronic discovery content management enables a full chain of custody or end-to-end electronic content discovery platform. By exposing different stages as separate applications (Collection, Processing, Investigation, and Review) the systems disclosed herein allow users to cover full case-management and monitoring from collection, data-loading to production, referred to generally as end-to-end.

In some embodiments, content can be processed using a Raw Data Unit (RDU) or Media Unit, which refers to an identified sub-set of files in a media drive that refers to a collection of files. This RDU can be used for tracking which information shipped in the media has been uploaded to staging, and which files have been left behind. The system 100 can track each high-level folder at a pre-configured depth as a separate RDU. All content under an RDU is either picked for staging or rejected from processing. Specific files may not be selected for staging from a given RDU. In short, these data in an RDU refer to data that is not yet staged but is only in the check-in location, where the uploaded documents arrive, or where the shipped data is copied from media drives.

A Staging Data Unit (SDU) or Transfer Unit is a set of files/documents that are copied to a staging location in one iteration. Based on the priorities given by a project manager or the client, data can be moved from check-in location to staging location in tranches. Each movement constitutes one Transfer Unit and one Transfer Unit can stage one or more RDUs/Media Units. In short, this refers to the data that is staged and is available for further processing.

Figure 2:
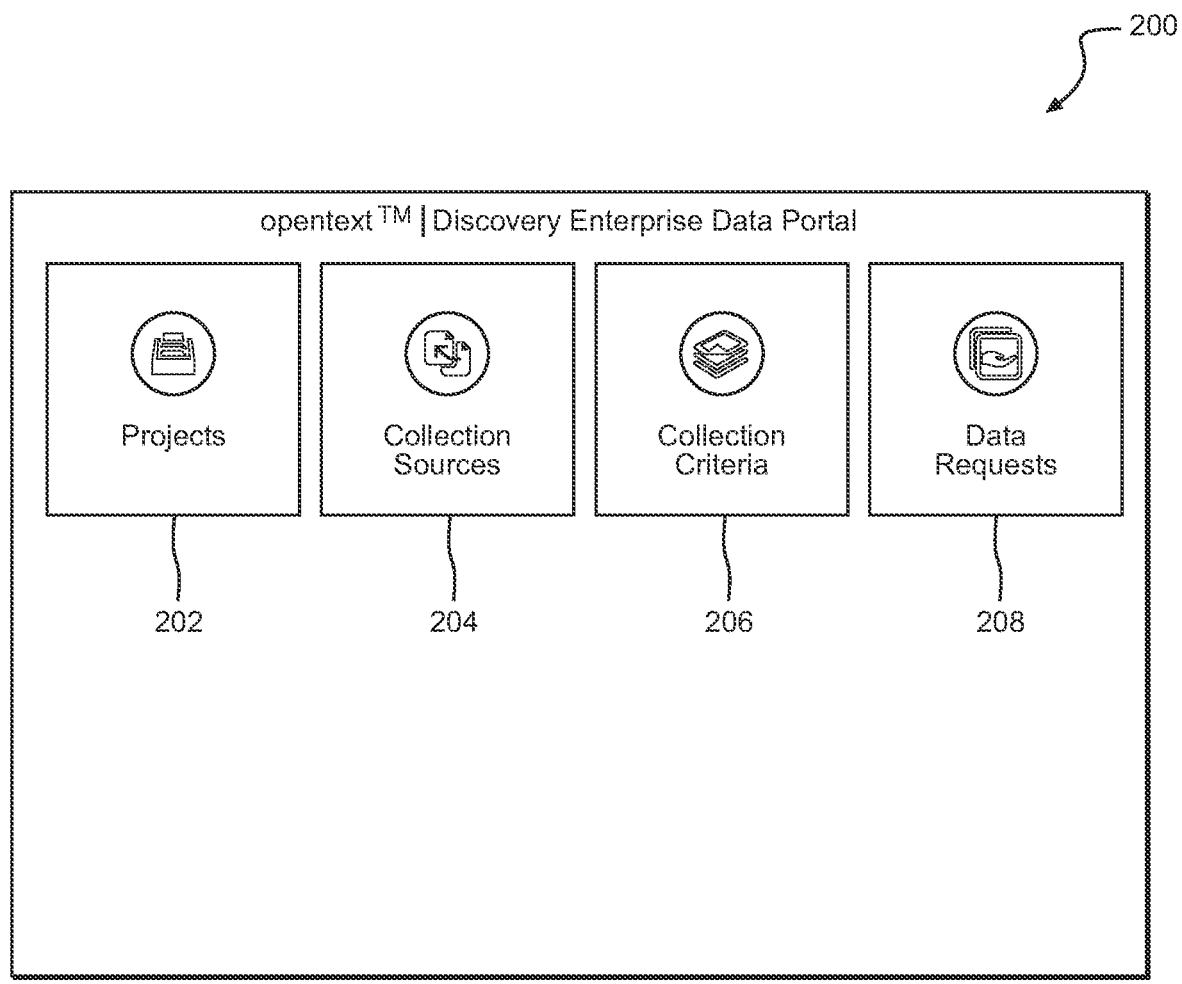
FIG. 2 illustrates an example graphical user interface of a landing page of provided by the enterprise data portal that allows a user to utilize various modules or functions such as projects, collection sources, collection criteria, and data requests.

FIG. 2 illustrates an example graphical user interface of a landing page 200 of provided by the enterprise data portal that allows a user to utilize various modules or functions such as projects 202, collection sources 204, collection criteria 206, and data requests 208.

FIG. 3 is a graphical user interface 300 that comprises attributes of various projects that have been created by a user. In general, each project can be assigned a unique name 302, an ECA name 304, an ECA status (such as running or complete) 306, an R&A name 308, collection sources 310 that identifies a number of collection sources, and collection targets 312 that identifies a number of collection targets, as well as a number of data requests. In general, the R&A name 308 identifies a matter for a case. Generally, a case is split up into multiple matters or review sites, and a set of reviewers are assigned to each matter.

A collection source graphical user interface 400 is illustrated in FIG. 4 identifies the collection agents (could include a collection agent of the content collection manager 104 (see FIG. 1A) or the crawler connectors 114A-114N) that have been created for a data request. The collection source graphical user interface 400 also identifies source parameters such as source names (e.g., names of target sources) in association with the collection agents assigned to the source names. The collection source parameters can also include the number of collection targets, the number of projects, and the number of data requests.

Figure 5:
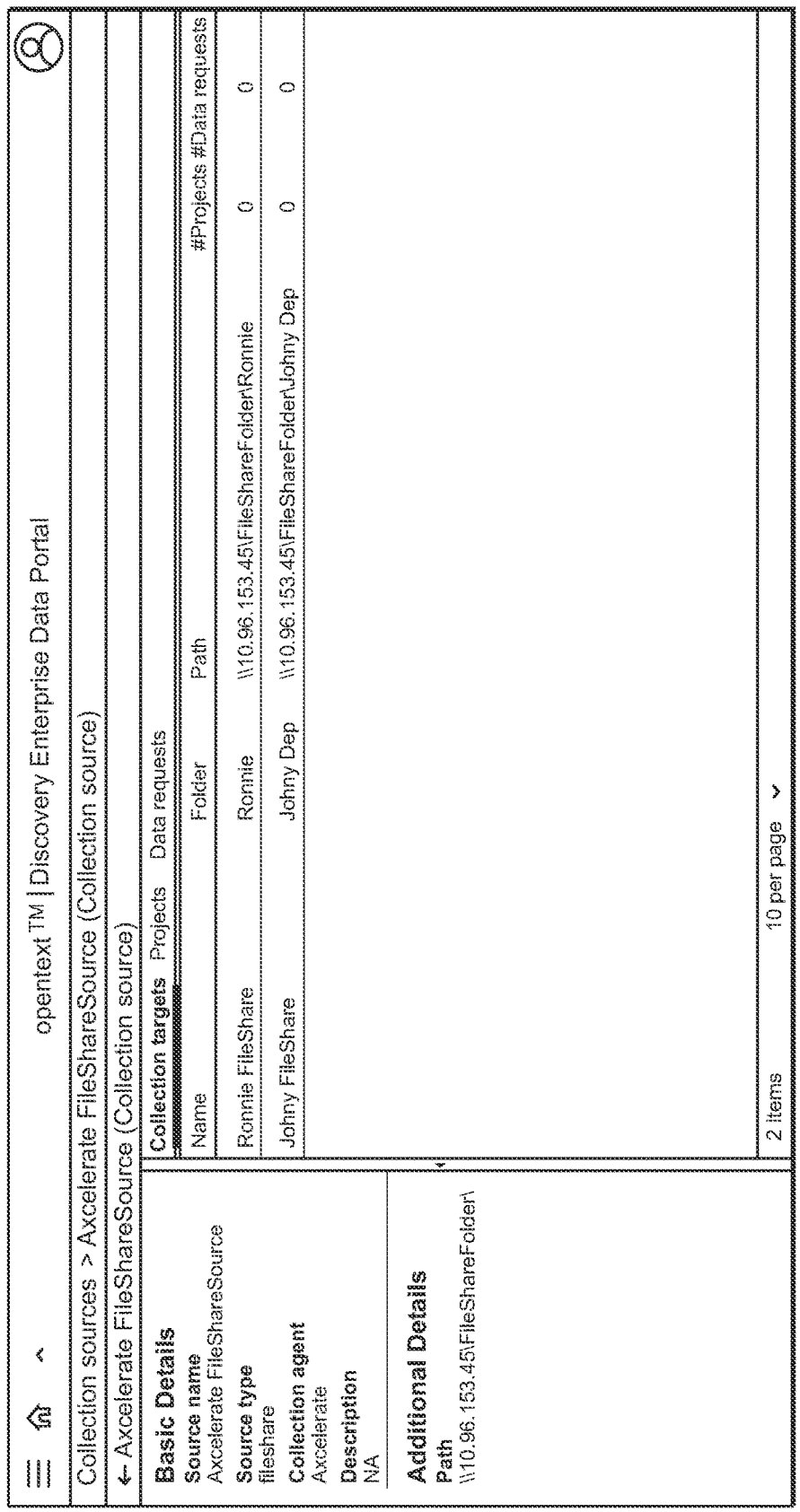
FIG. 5 illustrates an example graphical user interface of collection sources and shows all configured target locations on the source.
Figure 6:
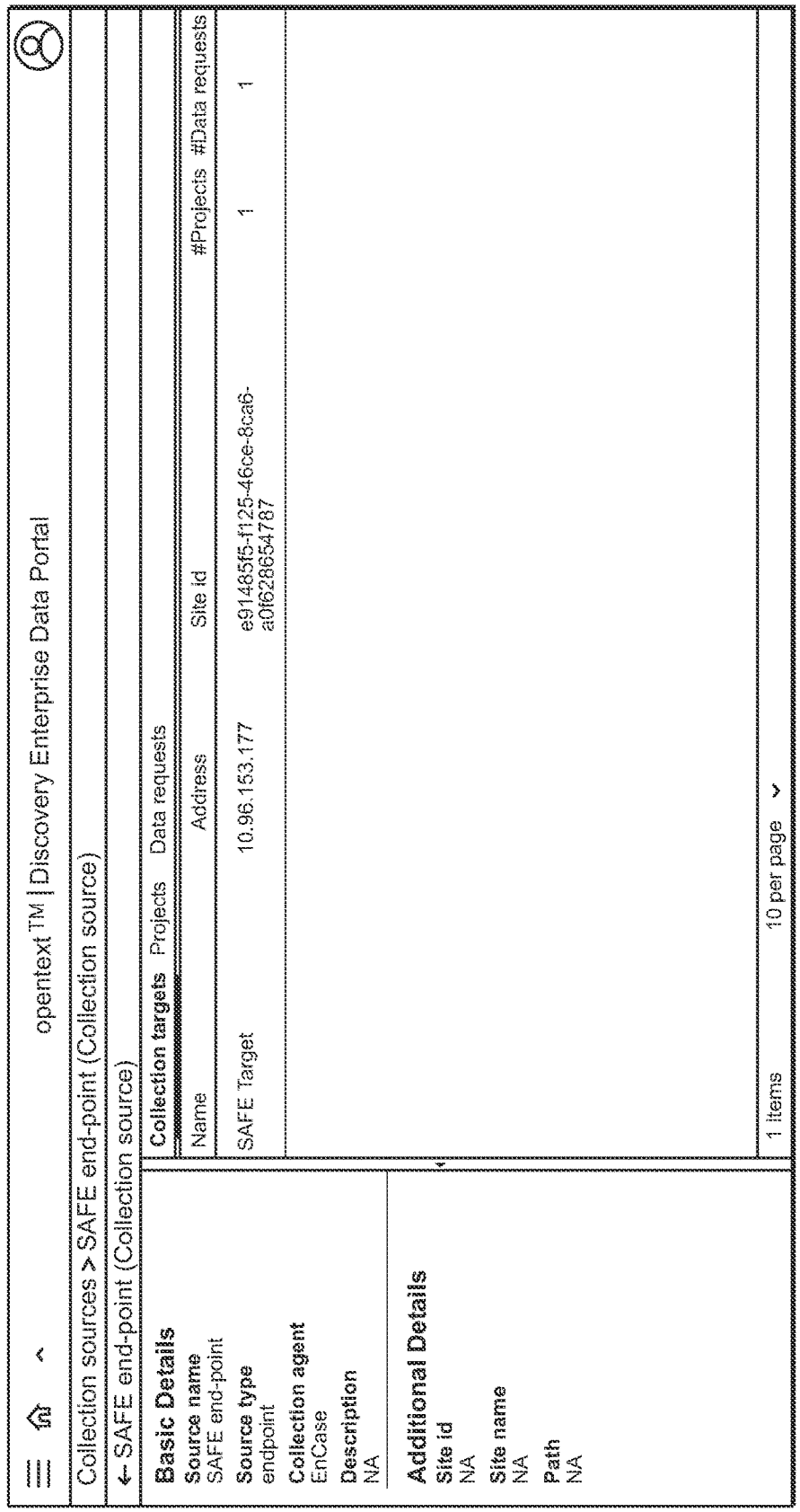
FIG. 6 illustrates an example graphical user interface that lists a SAFE endpoint defined on the SAFE installation as a target.

A pair of collection target GUIs 500 and 600 are illustrated in FIGS. 5 and 6, respectively. The details GUI 500 illustrates collection sources and shows all configured target locations on the source. The GUI 500 identifies specific folders on a fileshare defined as targets. The GUI 600 lists a SAFE endpoint defined on the SAFE installation as a target.

An example collection criteria GUI 700 is illustrated in FIG. 7. The collection criteria GUI 700 illustrates some example criteria that can be applied for document collections. In one example, a document collection project includes criteria used to collect documents only from an individual named Ronnie. In general, only files that satisfy the selected criteria are collected for any data request.

An example data request GUI 800 that includes a plurality of data request instances is illustrated in FIG. 8. This data request GUI 800 lists all data requests and their details/status for all the projects set up in the installation for which a data collection portal can control.

Figure 9:
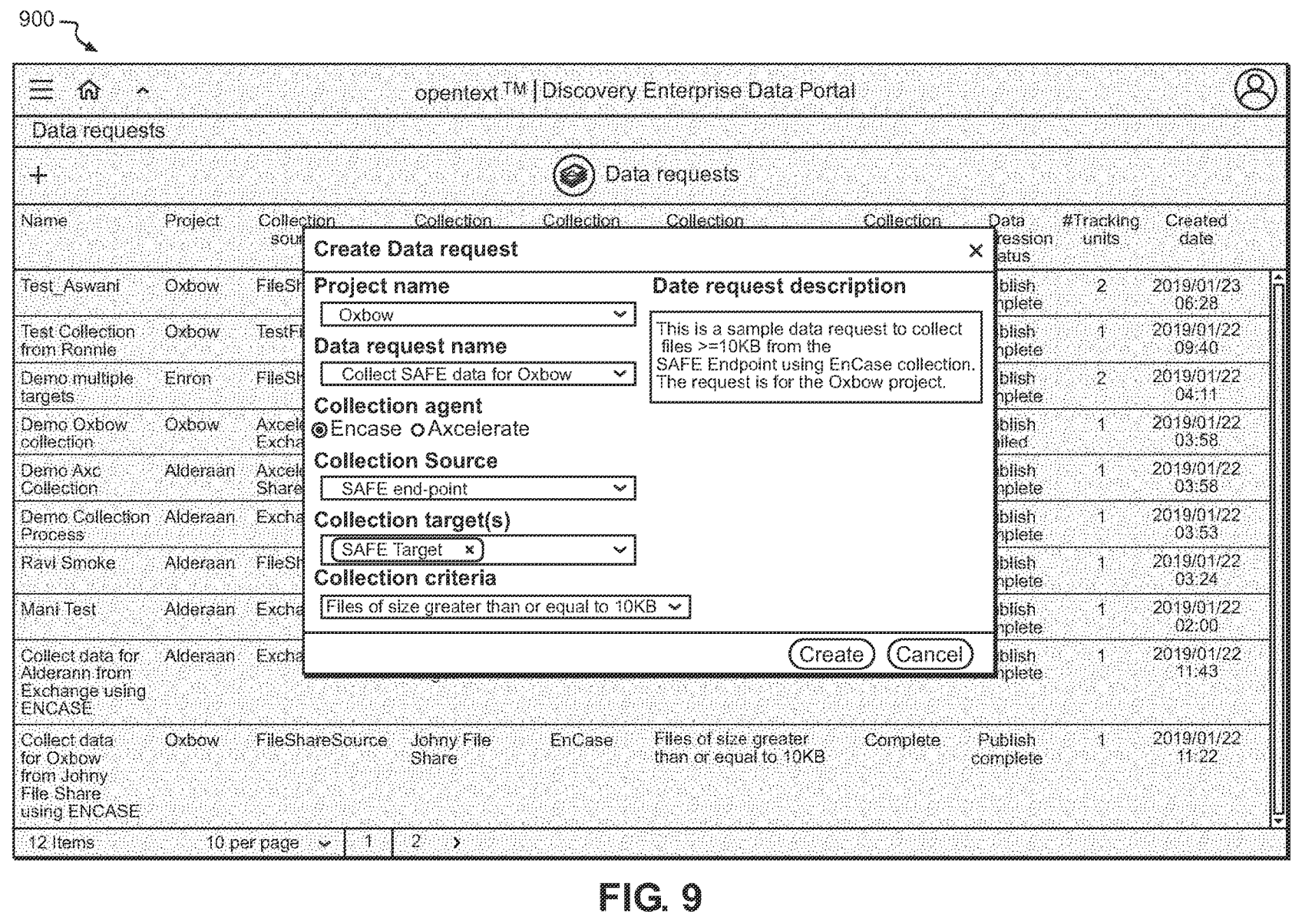
Figure 10:
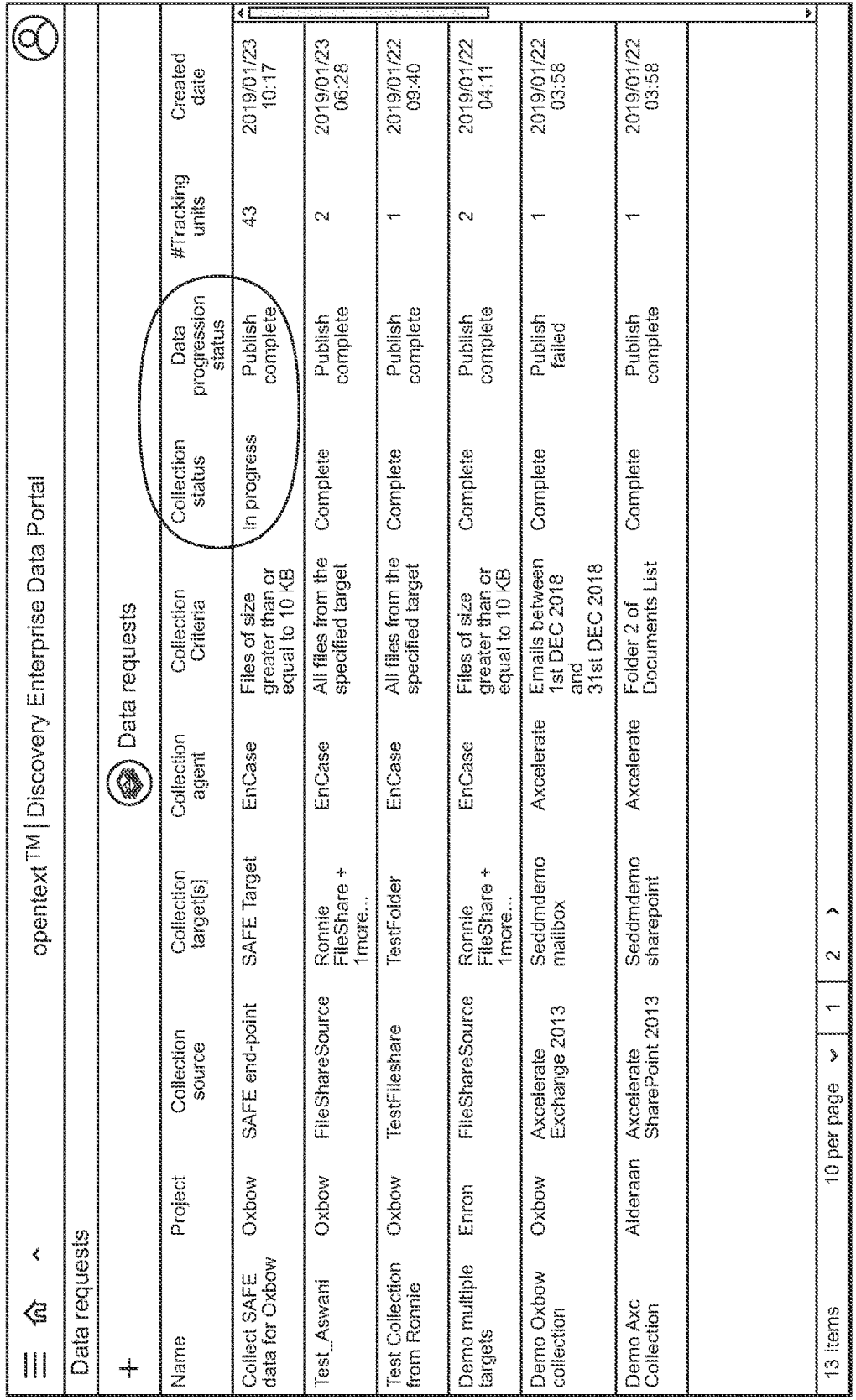
FIG. 10 illustrates an example graphical user interface for data request status tracking.

An example data request creation form 900 is illustrated in FIG. 9. New requests to collect data for existing projects can be created by specifying the collection source, target, and criteria details for the collection process. Data request status tracking is illustrated in GUI 1000 of FIG. 10. Once a data request is created, its status can be tracked on a live or real-time basis. While collection can still be in progress (collection status), other data might have already been published (e.g., data progression status).

Figure 11:
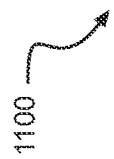
FIG. 11 is a graphical user interface that illustrates the chain of custody features disclosed above that are enabled through use of tracking units.

FIG. 11 is a GUI 1100 that illustrates the chain of custody features disclosed above that are enabled through use of tracking units. As noted above, a tracking unit is a set of documents collected at a given point in time and which move together in the EDRM cycle (for example from the content collection manager 104 to the investigation platform 108). A set of documents can be assigned a tracking unit such as TU-26. The collection target is identified by type and a status is provided. In this example, a publish step has failed, which indicates that some type of error has occurred in the document collection and/or processing steps which have prevented the publishing of documents to a review platform. A failure could occur relative to document collection when a target source having a password protected document system that cannot be accessed. In another example, a failure could include the investigation platform 108 being unable to ingest and crawl through a document due to an unknown file extension. In sum, the use of tracking units allows a user to identify, at any point, how many files have gone through what stage of document collection and processing, how long it took to migrate from one stage to another, or select individual files that fail to progress.

Figure 12:
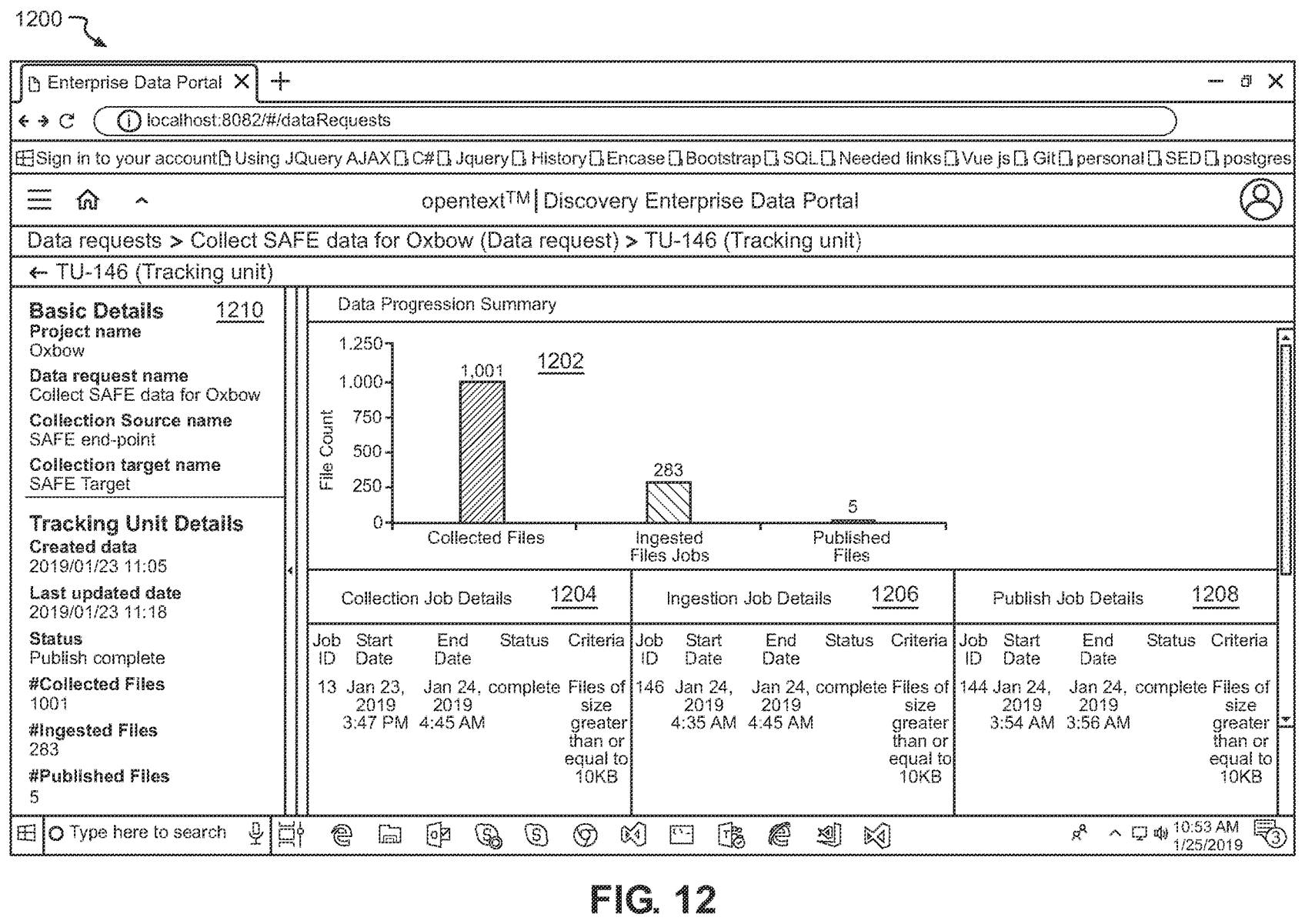

The GUI 1100 also indicates how many documents belong to the set of documents of the tracking unit, as well as how many of these collected documents have been ingested (e.g., processed), and ultimately published. The set of documents can be time-stamped relative to when the documents were obtained (e.g., creation date), as well as a most recent time stamp when an action occurred relative to the documents of the tracking unit. Further detailed information regarding data associated with a tracking unit can be found in FIG. 12. FIG. 12 includes a GUI 1200 that comprises a bar graph that visually depicts a data progression summary 1202 relative to files collected, ingested, and published. The collection job details for the tracking unit (TU-146) are illustrated in area 1204. Ingestion details are provided in area 1206, and publish details are provided in area 1208. Basic information regarding the tracking unit can be provided in a side pane 1210 of the GUI 1200.

Figure 13:
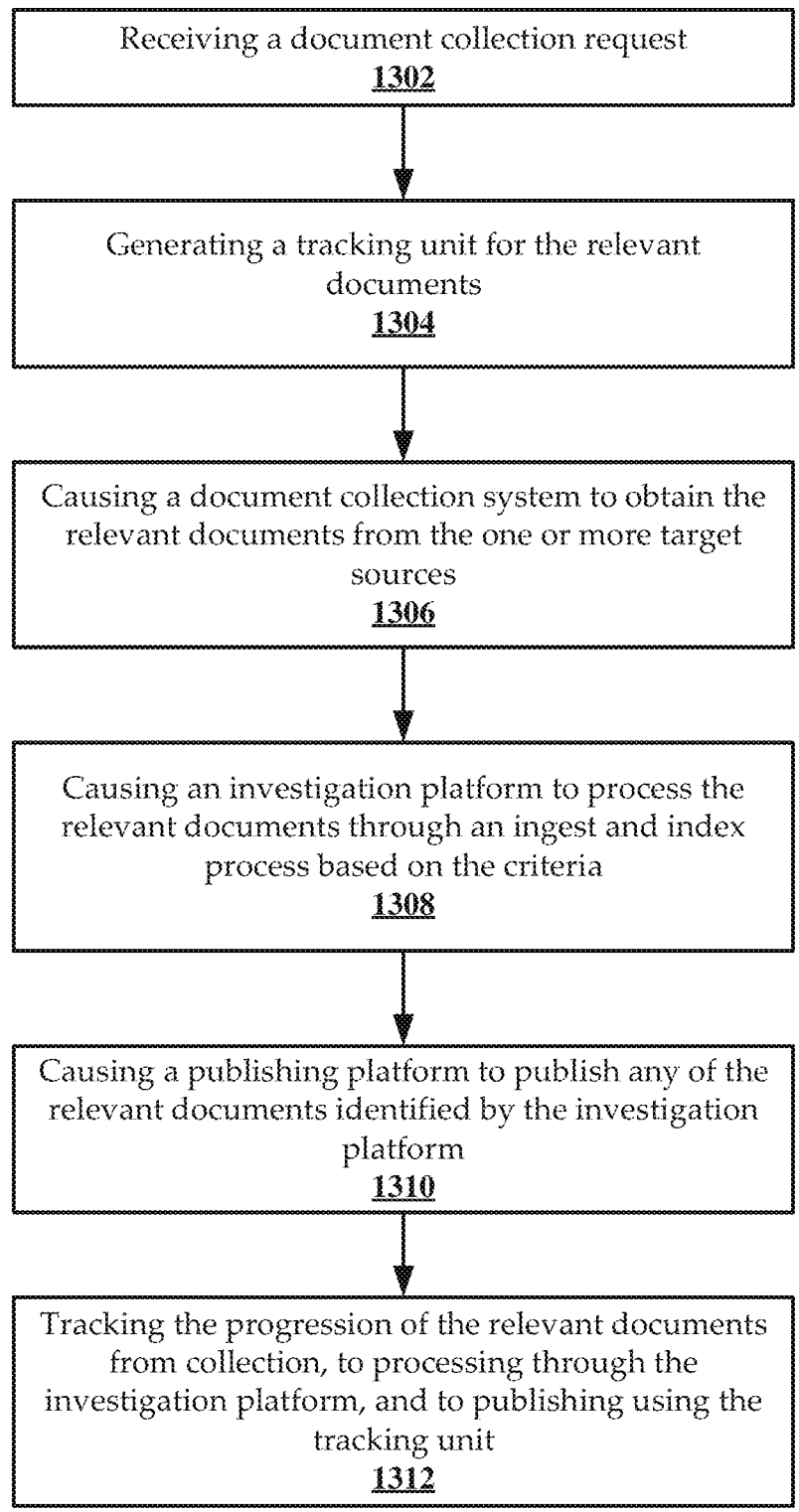
FIG. 13 is a flowchart of an example method of the present disclosure.

FIG. 13 is a flowchart of an example method of the present disclosure. The method includes a step 1302 of receiving a document collection request. As noted above, the request can comprise criteria used to select relevant documents from one or more target sources. The method also includes a step 1304 of generating a tracking unit for the relevant documents. The tracking unit can be used to track the progression of the relevant documents from collection, to processing through the investigation platform, and to publishing.

Next, the method can include a step 1306 of causing a document collection system to obtain the relevant documents from the one or more target sources, as well as a step 1308 of causing an investigation platform to process the relevant documents through an ingest and index process based on the criteria.

The method can include a step 1310 of causing a publishing platform to publish any of the relevant documents identified by the investigation platform. The method can comprise a step 1312 of tracking the progression of the relevant documents from collection to processing through the investigation platform, and publishing using the tracking unit. To be sure, step 1312 is a continuous process that can be initiated when a document collection request is received and continues as documents are collected, ingested (crawled and indexed), and ultimately published to create chain of custody proof. The tracking also identifies relevant metrics related to each document processing step such as numbers of relevant documents that were collected, numbers of relevant documents that were processed (ingested), and numbers of relevant documents that were published.

As noted above, these metrics can be provided on various graphical user interfaces. For example, a graphical user interface can be created that illustrates the progression of the relevant documents from collection, to processing through the investigation platform, and to publishing based on the tracking unit.

A graphical user interface can be created that identifies any of the relevant documents that have failed to progress to publishing. A graphical user interface can be created that identifies progression times required for the relevant documents to be collected, processed through the investigation platform, and published. A graphical user interface can be created that identifies a last current action associated with the tracking unit.

A graphical user interface can comprise a graphical representation of a number of the relevant documents that have been collected versus a number of the relevant documents that have been indexed, as well as a number of the relevant documents that have been published.

A graphical user interface can identify a start and end date for each of collection, processing, and publishing of the relevant documents. A graphical user interface can be configured to identify at least one of the relevant documents that have failed to publish or have failed to be processed.

Figure 14:
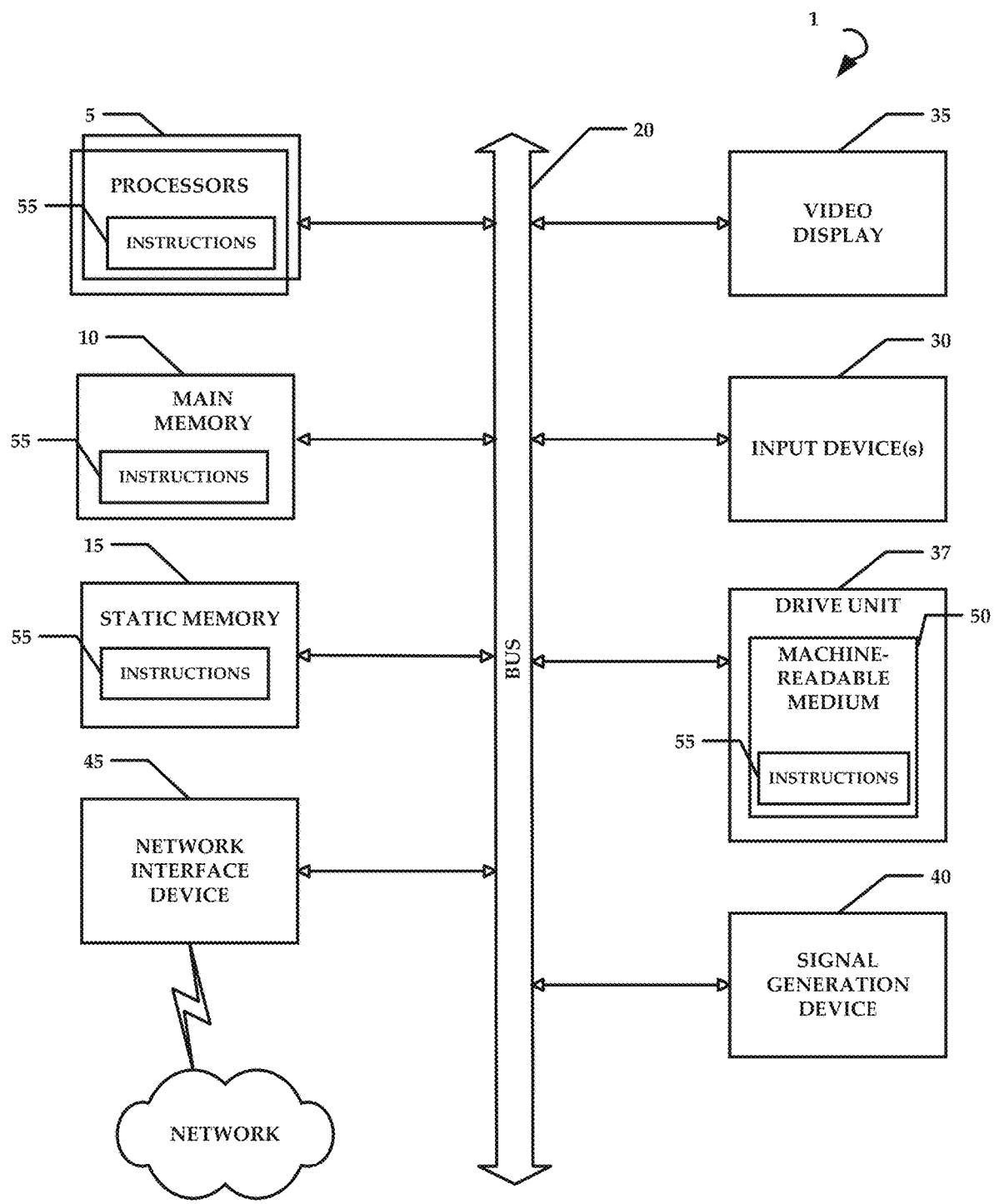
FIG. 14 is a diagrammatic representation of an example machine in the form of a computer system.

FIG. 14 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 of FIG. 14 are those typically found in computer systems that may be suitable for use with embodiments of the present disclosure and are intended to represent a broad category of such computer components that are well known in the art. Thus, the computer system 1 of FIG. 14 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An electronic discovery system, comprising:
a memory for storing executable instructions for controlling review of a document; and
a processor configured to execute the instructions, the instructions including:
a document collection system that collects relevant documents from one or more target sources;
an investigation platform that processes the relevant documents;
a portal system that interfaces the document collection system and the investigation platform to provide end-to-end electronic discovery, the portal system being configured to:
receive a document collection request, the request comprising criteria used to select the relevant documents from the one or more target sources;
generate a tracking unit for the relevant documents collected at a given period of time, the tracking unit being used to track progression of the relevant documents end-to-end from collection, to processing through the investigation platform, and to publishing, the tracking unit comprising a fundamental atomic unit of data used for tracking the relevant documents, wherein all data of the tracking unit is configured to travel together through the electronic discovery system, and a number of relevant documents in the tracking unit is immutable;

cause the document collection system to obtain the relevant documents from the one or more target sources based on user-selected criteria;

cause the investigation platform, using one or more crawler connectors and machine learning logic of the investigation platform, to process the relevant documents from the one or more target sources, through an ingest and index process based on the criteria, wherein the one or more crawler connectors crawl and index the relevant documents by identifying a document type for each of the relevant documents and analyzing textual content of each of the relevant documents for indexing;

cause the investigation platform to update its machine learning logic so that further documents are processed more accurately, based on the investigation platform receiving:
 (1) a determination by a subject matter expert that at least one of the relevant documents is irrelevant; or
 (2) a correction by the subject matter expert of a predictive coding of at least one of the relevant documents; and a publishing platform that is configured to publish any of the relevant documents identified by the investigation platform.

2. The electronic discovery system according to claim 1, wherein the portal system is configured to generate a graphical user interface that illustrates the progression of the relevant documents from the collection, to the processing through the investigation platform, and to the publishing based on the tracking unit.

3. The electronic discovery system according to claim 2, wherein the graphical user interface identifies any of the relevant documents that have failed to progress to publishing.

4. The electronic discovery system according to claim 2, wherein the graphical user interface identifies progression times required for the relevant documents to be collected, processed through the investigation platform, and published.

5. The electronic discovery system according to claim 2, wherein the graphical user interface identifies a last current action associated with the tracking unit.

6. The electronic discovery system according to claim 2, wherein the graphical user interface comprises a graphical representation of a number of the relevant documents that have been collected versus a number of the relevant documents that have been indexed, as well as a number of the relevant documents that have been published.

7. The electronic discovery system according to claim 2, wherein the graphical user interface identifies start and end dates for each of the collection, the processing, and the publishing of the relevant documents.

8. The electronic discovery system according to claim 2, wherein the graphical user interface identifies at least one of the relevant documents that have failed to publish or have failed to be processed.

9. The electronic discovery system according to claim 1, wherein the tracking unit is used to create a chain of custody for the relevant documents.

10. The electronic discovery system according to claim 1, wherein the investigation platform processes the relevant documents in an automated manner using rules, resulting in rule-based data progressions.

11. The electronic discovery system according to claim 1, wherein the portal system is configured to generate a graphical user interface that provides relevant metrics related to document progression, the metrics comprising a number of the relevant documents that were collected, a number of the relevant documents that were processed, and a number of the relevant documents that were published.

12. The electronic discovery system according to claim 1, wherein the one or more crawler connectors further comprise a first crawler connector for processing the relevant documents based on a first specified purpose and a second crawler connector for processing the relevant documents based on a second specified purpose that is different from the first specified purpose.

13. The electronic discovery system according to claim 1, the instructions further comprising a launchpad platform that synchronizes status of the data and receives user-specified requests for relevant documents.

14. The electronic discovery system according to claim 1, wherein the machine learning logic of the investigation platform is continuous.

15. A system, comprising:
 a processor; and
 a memory for storing instructions, the processor executing the instructions to:
  receive a document collection request, the request comprising criteria used to select relevant documents from one or more target sources;
  generate a tracking unit for the relevant documents collected at a given period of time, the tracking unit being used to track progression of the relevant documents from collection, to processing through an investigation platform, and to publishing on a publishing platform, the tracking unit comprising a fundamental atomic unit of data used for tracking the relevant documents, wherein all data of the tracking unit is configured to travel together through an electronic discovery system, and a number of relevant documents in the tracking unit is immutable;
  cause a document collection system to obtain the relevant documents from the one or more target sources based on user-selected criteria;
  cause the investigation platform, using one or more crawler connectors and machine learning logic of the investigation platform, to process the relevant documents from the one or more target sources, through an ingest and index process based on the criteria, wherein the one or more crawler connectors crawl and index the relevant documents by identifying a document type for each of the relevant documents and analyzing textual content of each of the relevant documents for indexing;
  cause the investigation platform to update its machine learning logic so that further documents are processed more accurately, based on the investigation platform receiving:
   (1) a determination by a subject matter expert that at least one of the relevant documents is irrelevant; or
   (2) a correction by the subject matter expert of a predictive coding of at least one of the relevant documents; and
  cause a publishing platform to publish any of the relevant documents identified by the investigation platform.

16. The system according to claim 15, wherein the tracking unit is used to create a chain of custody for the relevant documents.

17. The system according to claim 15, wherein the processor executes the instructions to generate a graphical user interface that illustrates the progression of the relevant documents from the collection, to the processing through the investigation platform, and to the publishing based on the tracking unit, and wherein the graphical user interface comprises a graphical representation of a number of the relevant documents that have been collected versus a number of the relevant documents that have been indexed, as well as a number of the relevant documents that have been published.

18. The system according to claim 15, wherein the processor executes the instructions to identify any of the relevant documents that have failed to progress to publishing.

19. The system according to claim 15, wherein the processor executes the instructions to identify progression times required for the relevant documents to be collected, processed through the investigation platform, and published.

20. The system according to claim 15, wherein the processor executes the instructions to identify a last current action associated with the tracking unit.

21. A method, comprising:
receiving a content collection request, the request comprising criteria used to select relevant documents from one or more target sources;
generating a tracking unit for the relevant documents collected at a given period of time, the tracking unit being used to track progression of the relevant documents from collection, to crawling and indexing, and to publishing, the tracking unit comprising a fundamental atomic unit of data used for tracking the relevant documents, wherein all data of the tracking unit is configured to travel together through an electronic discovery system, and a number of relevant documents in the tracking unit is immutable;
causing an document collection system to obtain the relevant documents from the one or more target sources;
causing an investigation platform, using one or more crawler connectors and machine learning logic of the investigation platform, to process the relevant documents from the one or more target sources, through an ingest and index process based on the criteria, wherein the one or more crawler connectors crawl and index the relevant documents by identifying a document type for each of the relevant documents and analyzing textual content of each of the relevant documents for indexing;
causing the investigation platform to update its machine learning logic so that further documents are processed more accurately, based on the investigation platform receiving:
(1) a determination by a subject matter expert that at least one of the relevant documents is irrelevant; or
(2) a correction by the subject matter expert of a predictive coding of at least one of the relevant documents; and
causing a publishing platform to publish any of the relevant documents identified by the investigation platform.

22. The method according to claim 21, further comprising generating a graphical user interface that illustrates the progression of the relevant documents from the collection, to the processing through the investigation platform, and to the publishing based on the tracking unit, and wherein the graphical user interface comprises a graphical representation of a number of the relevant documents that have been collected versus a number of the relevant documents that have been indexed, as well as a number of the relevant documents that have been published.

23. The method according to claim 21, further comprising generating a graphical user interface that identifies any of the relevant documents that have failed to progress to publishing.

24. The method according to claim 21, further comprising generating a graphical user interface that identifies progression times required for the relevant documents to be collected, processed through the investigation platform, and published.

25. The method according to claim 21, further comprising generating a graphical user interface that identifies a last current action associated with the tracking unit.

* * * * *